US008560189B2

(12) United States Patent
Tanaka et al.

(10) Patent No.: US 8,560,189 B2
(45) Date of Patent: Oct. 15, 2013

(54) CONTINUOUSLY VARIABLE TRANSMISSION AND SHIFT CONTROL METHOD

(75) Inventors: Hiroyasu Tanaka, Atsugi (JP);
Takuichiro Inoue, Fujisawa (JP);
Ryousuke Nonomura, Kawasaki (JP);
Takashi Eguchi, Machida (JP); Mamiko Inoue, Ebina (JP); Seiichiro Takahashi, Isehara (JP)

(73) Assignee: Jatco Ltd, Fuji-shi (JP)

( * ) Notice: Subject to any disclaimer, the term of this patent is extended or adjusted under 35 U.S.C. 154(b) by 38 days.

(21) Appl. No.: 13/230,026

(22) Filed: Sep. 12, 2011

(65) Prior Publication Data
US 2012/0083977 A1 Apr. 5, 2012

(30) Foreign Application Priority Data

Sep. 30, 2010 (JP) ................................ 2010-221535

(51) Int. Cl.
G01C 21/26 (2006.01)
G08G 1/09 (2006.01)

(52) U.S. Cl.
USPC ................................................. 701/55; 701/6

(58) Field of Classification Search
USPC ................. 701/55, 51, 110, 52; 477/148, 175
See application file for complete search history.

(56) References Cited

U.S. PATENT DOCUMENTS

| 4,548,101 | A | * | 10/1985 | Akashi et al. | .................... | 74/720 |
| 4,566,348 | A | * | 1/1986 | Akashi et al. | .................... | 74/359 |
| 4,576,063 | A | * | 3/1986 | Akashi et al. | .................... | 74/745 |
| 4,594,908 | A | * | 6/1986 | Akashi et al. | .................... | 74/359 |
| 4,616,521 | A | * | 10/1986 | Akashi et al. | .................... | 74/335 |
| 4,622,866 | A | * | 11/1986 | Ito et al. | ......................... | 477/122 |
| 4,823,646 | A | * | 4/1989 | Yoshimura et al. | ........... | 477/148 |
| 6,209,406 | B1 | * | 4/2001 | Sperber et al. | ................... | 74/330 |
| 6,412,361 | B1 | * | 7/2002 | Wolf et al. | ................... | 74/336 R |
| 6,427,108 | B1 | * | 7/2002 | Kanasugi et al. | ............... | 701/51 |
| 7,044,890 | B2 | * | 5/2006 | Kojima et al. | .................... | 477/175 |
| 7,204,166 | B2 | * | 4/2007 | Gochenour | ..................... | 74/340 |
| 7,252,621 | B2 | * | 8/2007 | Tanba et al. | ...................... | 477/77 |
| 7,347,803 | B2 | * | 3/2008 | Kobayashi et al. | ............... | 477/5 |
| 7,351,182 | B2 | * | 4/2008 | Kobayashi | .......................... | 477/5 |
| 7,359,784 | B2 | * | 4/2008 | Murasugi et al. | ............... | 701/51 |
| 7,399,256 | B2 | * | 7/2008 | Tanba et al. | ...................... | 477/74 |

(Continued)

FOREIGN PATENT DOCUMENTS

EP 0 972 971 A2 1/2000
EP 2 169 278 A1 3/2010

(Continued)

Primary Examiner — Thomas Black
Assistant Examiner — Robert Payne
(74) Attorney, Agent, or Firm — Foley & Lardner LLP

(57) ABSTRACT

Continuously variable transmission includes: a variator; a stepwise auxiliary transmission mechanism; and a shift controller configured to set a desired through transmission ratio based on the calculated desired target rotational speed, the shift control section including; a slope road upshift prohibiting section configured to prohibit upshift of the auxiliary transmission mechanism when the vehicle runs on a slope road, and a slope road upshift section configured to upshift the auxiliary transmission mechanism when the vehicle runs in a predetermined running state when the slope road upshift prohibiting section prohibits upshift of the auxiliary transmission mechanism, and to perform the shift of the auxiliary transmission mechanism while the transmission ratio of the variator is varied in accordance with the variation of the transmission ratio of the auxiliary transmission mechanism to prevent varying the through transmission ratio even when the vehicle runs on the slope road.

5 Claims, 6 Drawing Sheets

(56) References Cited

U.S. PATENT DOCUMENTS

| | | | |
|---|---|---|---|
| 7,507,182 B2 * | 3/2009 | Matsumura et al. | 477/174 |
| 7,736,270 B2 * | 6/2010 | Gierer et al. | 477/175 |
| 7,771,317 B2 * | 8/2010 | Gierer et al. | 477/175 |
| 7,798,928 B2 * | 9/2010 | Serkh | 474/70 |
| 8,050,827 B2 * | 11/2011 | Hasegawa et al. | 701/51 |
| 8,055,414 B2 * | 11/2011 | Tawara | 701/52 |
| 8,287,432 B2 * | 10/2012 | Nedachi et al. | 477/175 |
| 8,296,041 B2 * | 10/2012 | Yamamura et al. | 701/110 |
| 2004/0110601 A1 | 6/2004 | Kojima et al. | |
| 2011/0238276 A1 * | 9/2011 | Tsujimura et al. | 701/68 |
| 2012/0078457 A1 * | 3/2012 | Tajima et al. | 701/22 |
| 2012/0083977 A1 * | 4/2012 | Tanaka et al. | 701/55 |
| 2012/0115679 A1 * | 5/2012 | Doering et al. | 477/70 |
| 2012/0216639 A1 * | 8/2012 | Renner | 74/331 |
| 2013/0012353 A1 * | 1/2013 | Yoshida et al. | 477/5 |

FOREIGN PATENT DOCUMENTS

| | | | |
|---|---|---|---|
| JP | 62-216831 A | | 9/1987 |
| JP | 63-266266 | | 11/1988 |
| JP | 63266266 A | * | 11/1988 |
| JP | 05-079554 A | | 3/1993 |

\* cited by examiner

CONTINUOUSLY VARIABLE TRANSMISSION AND SHIFT CONTROL METHOD

BACKGROUND OF THE INVENTION

This invention relates to a shift control of a continuously variable transmission having an auxiliary transmission when a vehicle runs on a slope road.

A continuously variable transmission including a continuously variable transmission mechanism (variator) and an auxiliary transmission mechanism arranged to selectively switch a plurality of forward shift stages has been known. In this transmission, it is possible to enlarge shift region by the auxiliary transmission mechanism relative to a continuously variable transmission constituted only by the variator. Accordingly, it is possible to improve efficiency of an engine, and to improve fuel consumption.

In this transmission, when the shift is performed together with the shift of the auxiliary transmission mechanism, the variator is shifted in a direction opposite to the shift direction of the auxiliary transmission mechanism when the shift of the auxiliary transmission mechanism is started. With this, the transmission ratios of the entire transmission before and after the shift are not varied. The variation of the rotational speed of the engine is suppressed, and accordingly it is possible to suppress shift shock (Japanese Patent Application Publication No. 5-79554).

Moreover, U.S. Pat. No. 4,823,646 (corresponding to Japanese Patent Application Publication No. 62-216831) discloses a transmission arranged to prohibit an upshift for preventing a shift busy and for ensuring a driving force when a running resistance is larger than an engine output when a vehicle runs on a slope road such as a climbing road.

SUMMARY OF THE INVENTION

In the above-described conventional transmissions, when the running resistance is larger than the engine output, the necessary driving force is ensured by restricting the shift of the transmission ratio of the transmission to the high side by prohibiting the upshift of the transmission. This method is used in a stepwise variable transmission and the continuously variable transmission.

In the continuously variable transmission with the auxiliary transmission mechanism which is arranged to shift by a coordinative shift (cooperative shift) of the variator and the auxiliary transmission mechanism, there is a region (B region) in which the identical through transmission ratios can be attained on the low side and the high side of the auxiliary transmission mechanism. When the auxiliary transmission mechanism is fixed to the transmission ratio on the low side for ensuring the driving force for running on the slope road when the vehicle runs in the above-described region, the variator is on the high side region relative to a case in which the auxiliary transmission mechanism is on the high side, since the through transmission ratios are identical. In general, the deceleration degree at the deceleration of the vehicle on the slope road is larger than the deceleration degree at the deceleration of the vehicle on the flat road. Accordingly, a time period until the vehicle stops from a predetermined vehicle speed on the slope road is shorter than a time period until the vehicle stops from the predetermined vehicle speed on the flat road. Accordingly, in a case in which the vehicle stops on the slope road when the transmission ratio of the variator is on the high side, the shift to the low side does not make it in time, and the vehicle may stop in the transmission ratio on the high side.

In this state, the driving force at the restart of the vehicle is deficient, so that the drivability is deteriorated.

It is, therefore, an object of the present invention to provide a continuously variable transmission which includes a variator and an auxiliary transmission mechanism, and which is devised to ensure a driving force of a vehicle when the vehicle runs on a slope road, and to obtain the driving force at a restart of the vehicle even when the vehicle stops on the slope road.

According to one aspect of the present invention, a continuously variable transmission mounted on a vehicle, and arranged to vary a rotational speed of an engine, the continuously variable transmission comprises: a variator arranged to continuously vary a transmission ratio; a stepwise auxiliary transmission mechanism disposed in series with the variator, and arranged to switch between a first shift stage on a lower speed side and a second shift stage on a higher speed side by engagements and disengagements of a plurality of frictional elements; and a shift controller configured to calculate a desired target rotational speed of the engine based on a driving state of the vehicle, to set a desired through transmission ratio which is a target transmission ratio, based on the calculated desired target rotational speed, to vary at least one of the transmission ratio of the variator and the shift stage of the auxiliary transmission mechanism, and to control so that a through transmission ratio which is an entire transmission ratio of the variator and the auxiliary transmission mechanism follows the desired through transmission ratio by a predetermined response, the shift control section including; a slope road upshift prohibiting section configured to prohibit an upshift of the auxiliary transmission mechanism when the vehicle runs on a slope road, and a slope road upshift section configured to upshift the auxiliary transmission mechanism when the vehicle runs in a predetermined running state when the slope road upshift prohibiting section prohibits the upshift of the auxiliary transmission mechanism, and to perform the shift of the auxiliary transmission mechanism while the transmission ratio of the variator is varied in accordance with the variation of the transmission ratio of the auxiliary transmission mechanism so as not to vary the through transmission ratio even when the vehicle runs on the slope road.

According to another aspect of the invention, a shift control method of a continuously variable transmission which includes a variator arranged to continuously vary a transmission ratio, and a stepwise auxiliary transmission mechanism disposed in series with the variator, and arranged to switch a transmission ratio by engagements and disengagements of a plurality of frictional elements, which is mounted on a vehicle, and which is arranged to vary an output rotation of a power source, and to output the output rotation, the shift control method comprises: calculating a desired target rotational speed of the power source based on a driving state of the vehicle; setting a desired through transmission ratio which is a target transmission ratio, based on the calculated desired target rotational speed; varying at least one of the transmission ratio of the variator and a shift stage of the auxiliary transmission mechanism; controlling so that a through transmission ratio which is an entire transmission ratio of the variator and the auxiliary transmission mechanism follows the desired through transmission ratio by a predetermined response; and upshifting the auxiliary transmission mechanism while the transmission ratio of the variator is varied in accordance with the variation of the transmission ratio of the auxiliary transmission mechanism so as not to vary the through transmission ratio when the vehicle runs in a predetermined running region in a case in which the vehicle runs on a slope road and an upshift of the auxiliary transmission mechanism is prohibited.

DETAILED DESCRIPTION OF THE INVENTION

Hereinafter, a continuously variable transmission and a shift control method according to one embodiment of the present invention are illustrated with reference to drawings. In below illustrations, a "transmission ratio" of a transmission mechanism is a value obtained by dividing an input rotational speed of the transmission mechanism by an output rotational speed of the transmission mechanism. Moreover, a "lowest transmission ratio" means a maximum transmission ratio of the transmission mechanism. A "highest transmission ratio" means a minimum transmission ratio of the transmission mechanism.

Figure 1:
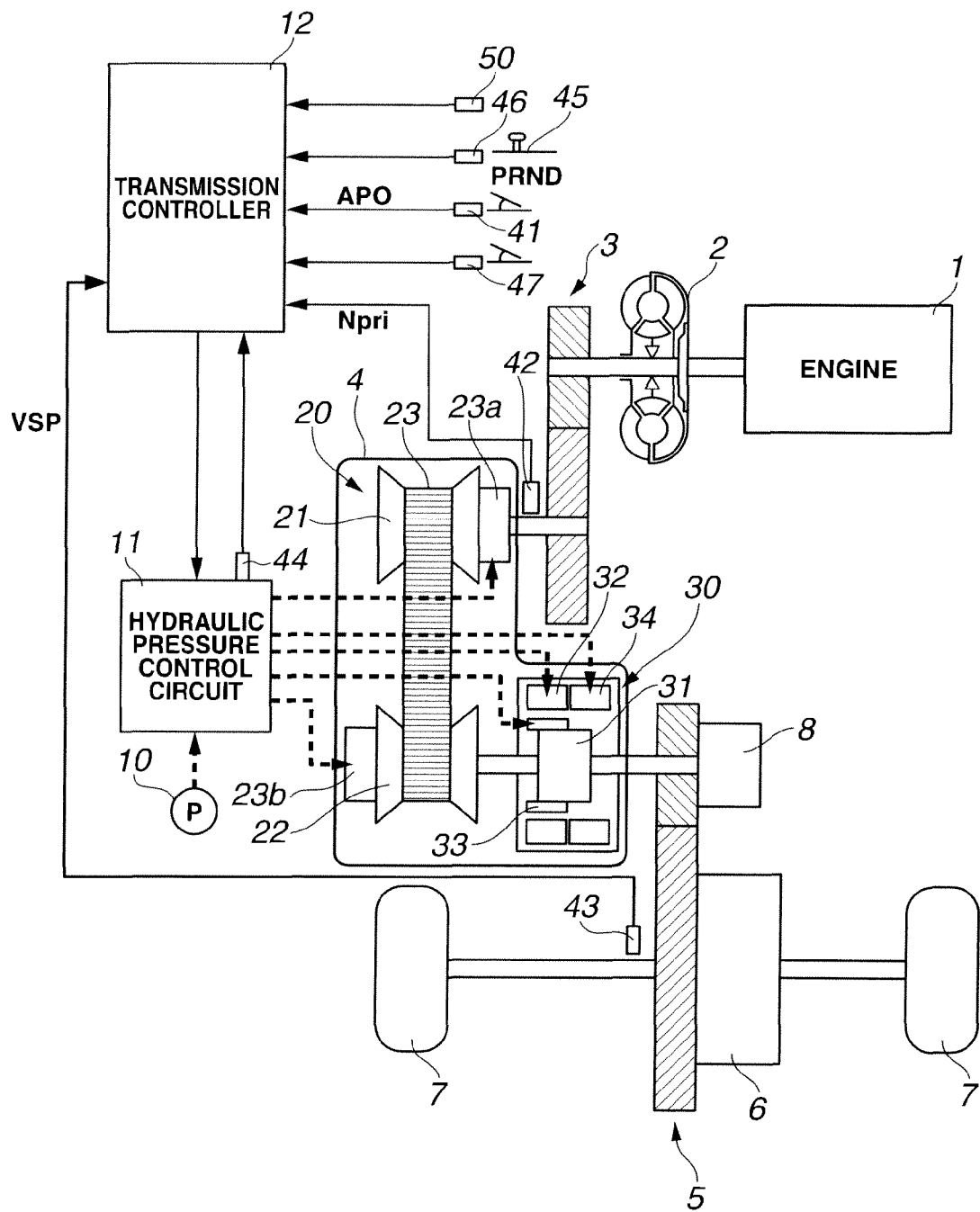
FIG. 1 is a schematic view showing a vehicle mounted with a continuously variable transmission according to one embodiment of the present invention.

FIG. 1 is a schematic view showing a vehicle mounted with a continuously variable transmission according to the one embodiment of the present invention. The vehicle includes an engine 1 serving as a power source. An output rotation of engine 1 is transmitted to driving wheels 7 through a torque converter 2 with a lockup clutch, a first gear train 3, a continuously variable transmission (hereinafter, referred to simply as a transmission 4), a second gear train 5, and a final reduction gear 6. The vehicle further includes a parking mechanism 8 provided to the second gear train 5, and arranged to mechanically lock an output shaft of transmission 4 during parking so that the output shaft of transmission 4 cannot rotate.

Moreover, the vehicle includes an oil pump 10 arranged to be driven by using a part of the power of engine 1; a hydraulic pressure control circuit 11 arranged to regulate a hydraulic pressure from oil pump 10, and to supply the regulated hydraulic pressure to various parts of transmission 4; and a transmission controller 12 configured to control hydraulic pressure control circuit 11.

Transmission 4 includes a continuously variable transmission mechanism (hereinafter, referred to as a variator 20), and an auxiliary transmission mechanism 30 disposed in series with variator 20. Here, "in series with" represents that auxiliary transmission mechanism 30 is disposed in series with variator 20 in an identical power transmitting path. Auxiliary transmission mechanism 30 may be connected directly with the output shaft of variator 20, like this embodiment. Alternatively, auxiliary transmission mechanism 30 may be connected with the output shaft of variator 20 through other transmission mechanism or other power transmitting mechanism (for example, gear train).

Variator 20 is a belt type continuously variable transmission mechanism including a primary pulley 21, a secondary pulley 22, a V belt 23 wound around primary pulley 21 and secondary pulley 22. Each of primary and secondary pulleys 21 and 22 includes a fixed conical disc; a movable conical disc disposed relative to the fixed conical disc so that respective sheave surfaces thereof confront each other so as to form a V groove between the fixed conical disc and the movable conical disc; and one of hydraulic cylinders 23a and 23b each of which is disposed behind one of the movable conical discs, and which is arranged to move the movable conical disc in an axial direction. By adjusting the hydraulic pressures supplied to hydraulic cylinders 23a and 23b, a width of the V groove is varied, so that contact radii between V belt 23 and pulleys 21, 22 are varied. Consequently, a transmission ratio vRatio of variator 20 is continuously varied.

Auxiliary transmission mechanism 30 is a transmission mechanism having two forward shift stages and one reverse shift stage. Auxiliary transmission mechanism 30 includes a Ravigneaux type planetary gear mechanism 31 in which careers of two planetary gears are connected; and a plurality of frictional engagement elements (a Low brake 32, a High clutch 33, and a Rev (Reverse) brake 34) connected with a plurality of rotational elements constituting Ravigneaux type planetary gear mechanism 31, and arranged to vary connection states with the rotational elements. A shift stage of auxiliary transmission mechanism 30 is varied by varying engagement/disengagement states of frictional engagement elements 32-34 by regulating the hydraulic pressures supplied to frictional engagement elements 32-34. For example, the shift stage of auxiliary transmission mechanism 30 becomes a first speed by engaging Low brake 32, and by disengaging High clutch 33 and Rev brake 34. The shift stage of auxiliary transmission mechanism 30 becomes a second speed which has a transmission ratio smaller than that of the first speed, by engaging High clutch 33, and by disengaging Low brake 32 and Rev brake 34. Moreover, the shift stage of auxiliary transmission mechanism 30 becomes a reverse speed by engaging Rev brake 34, and by disengaging Low brake 32 and High clutch 33. Hereinafter, when the shift stage of auxiliary transmission mechanism 30 is the first speed, it is represented by "transmission 4 is a low speed mode". When the shift stage of auxiliary transmission mechanism 30 is the second speed, it is represented by "transmission 4 is a high speed mode".

Figure 2:
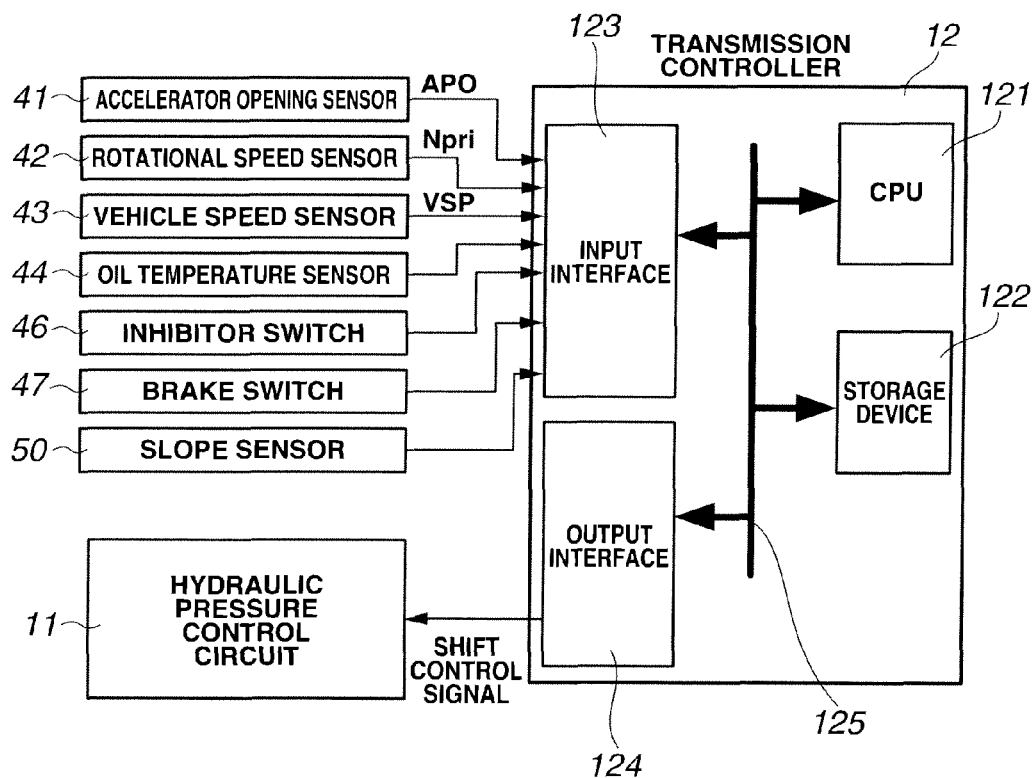
FIG. 2 is an illustrative view showing one example of a configuration of a transmission controller according to the one embodiment of the present invention.

As shown in FIG. 2, transmission controller 12 includes a CPU 121, a storage device 122 including a RAM and a ROM, an input interface 123, an output interface 124, and a bus 125 connecting these components to each other.

Input interface 123 receives an output signal of an accelerator opening sensor 41 arranged to sense an operating amount of an accelerator pedal (hereinafter, referred to as an accelerator opening APO), an output signal of a rotational speed sensor 42 arranged to sense an input rotational speed of transmission 4 (=a rotational speed of primary pulley 21, hereinafter, referred to as a primary rotational speed Npri), an output signal of a vehicle speed sensor 43 arranged to sense a running speed of the vehicle (hereinafter, referred to as a vehicle speed VSP), an output signal of an oil temperature sensor 44 arranged to sense an oil temperature of transmission 4, an output signal of an inhibitor switch 46 arranged to sense a position of a select lever 45, an output signal of a brake switch 47 arranged to sense a depression of the brake pedal, and an output signal of a slope sensor (gradient sensor or inclination sensor) 50 arranged to sense a slope (gradient or inclination) of a vehicle body in a running direction.

Storage device 122 stores a shift control program of transmission 4, and a shift map (FIG. 3) used by this shift control program. CPU 121 reads the shift control program stored in storage device 122. CPU 121 carries out this shift control program to perform various calculations of the various signals inputted through input interface 123, and generates a shift control signal. CPU 121 outputs this shift control signal through output interface 124 to hydraulic pressure control circuit 11. The various values used by the calculation of CPU 121 and the results of the calculation of CPU 121 are stored in storage device 122.

Hydraulic pressure control circuit 11 includes a plurality of fluid passages and a plurality of hydraulic pressure control valves. Hydraulic pressure control circuit 11 is configured to control the plurality of the hydraulic pressure control valves based on the shift control signal from transmission controller 12, and thereby to switch supply passages of the hydraulic pressure. Moreover, hydraulic pressure control circuit 11 is configured to adjust a necessary hydraulic pressure from the hydraulic pressure generated in oil pump 10, and to supply this necessary hydraulic pressure to the various parts of the transmission 4. With this, the transmission ratio vRatio of variator 20 and the shift stage of auxiliary transmission mechanism 30 are varied, and the shift of transmission 4 is performed.

Figure 3:
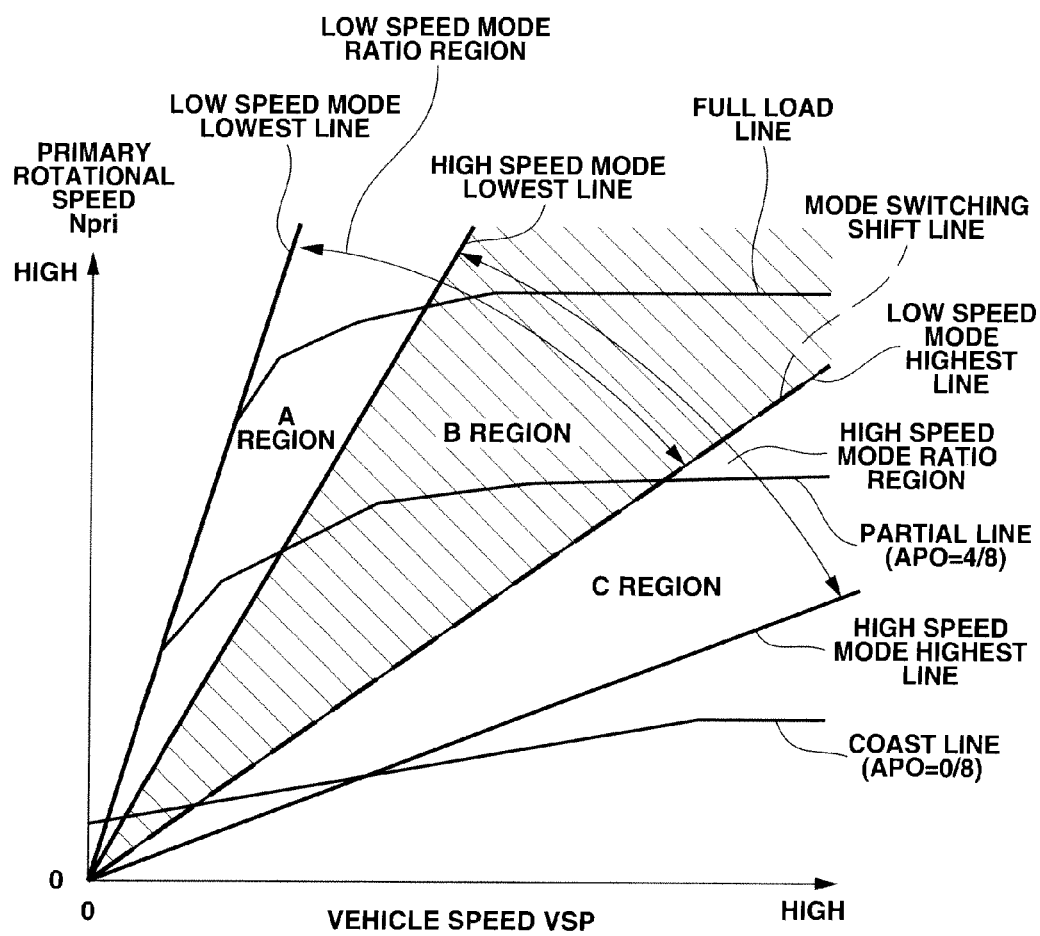
FIG. 3 is an illustrative view showing one example of a shift map in the one embodiment of the present invention.

FIG. 3 shows one example of the shift map stored in storage device 122 of transmission controller 12.

In this shift map, an operating point of transmission 4 is determined based on vehicle speed VSP and primary rotational speed Npri. An inclination of a line connecting the operating point of transmission 4 and a zero point of the shift map at a left lower corner represents the transmission ratio of transmission 4 (overall transmission ratio obtained by multiplying transmission ratio vRatio of variator 20 by transmission ratio subRatio of auxiliary transmission mechanism 30, hereinafter, referred to as a through transmission ratio Ratio). In this shift map, a shift line is set at each of accelerator openings APO, like the conventional belt type continuously variable transmission. The shift of transmission 4 is performed in accordance with the shift line selected in accordance with accelerator opening APO. For the sake of simplicity, FIG. 3 shows a full load line (a shift line at accelerator opening APO=8/8), a partial line (a shift line at accelerator opening APO=4/8), and a coast line (a shift line at accelerator opening APO=0) only.

When transmission 4 is in the low speed mode, transmission 4 can be shifted between a low speed mode lowest line obtained by maximizing transmission ratio vRatio of variator 20, and a low speed mode highest line obtained by minimizing transmission ratio vRatio of variator 20. In this case, the operating point of transmission 4 is moved within an A region and a B region. On the other hand, when transmission 4 is in the high speed mode, transmission 4 can be shifted between a high speed mode lowest line obtained by maximizing transmission ratio vRatio of variator 20, and a high speed mode highest line obtained by minimizing transmission ratio vRatio of variator 20. In this case, the operating point of transmission 4 is moved within the B region and a C region.

The transmission ratio of each of the shift stages of auxiliary transmission mechanism 30 is set so that the transmission ratio corresponding to the low speed mode highest line (a low speed mode highest transmission ratio) becomes smaller than the transmission ratio corresponding to the high speed mode lowest line (a high speed mode lowest transmission ratio). With this, a low speed mode ratio region which is a region of through transmission ratio Ratio of transmission 4 that can be attained in the low speed mode, and a high speed mode ratio region which is a region of through transmission ratio Ratio of transmission 4 that can be attained in the high speed mode are partially overlapped with each other. When the operating point of transmission 4 is in the B region which is sandwiched by the high speed mode lowest line and the low speed mode highest line, transmission 4 can select either the low speed mode or the high speed mode.

Transmission controller 12 sets, as a desired through transmission ratio DRatio, the through transmission ratio corresponding to vehicle speed VSP and accelerator opening APO (a driving state of the vehicle), with reference to this shift map. This desired through transmission ratio DRatio is a target value that through transmission ratio Ratio should finally attain in this driving state. Moreover, transmission controller 12 sets a target through transmission ratio tRatio which is a transient target value that through transmission ratio Ratio follows the desired through transmission ratio DRatio by a desired response characteristic. Transmission controller 12 controls variator 20 and auxiliary transmission mechanism 30 so that through transmission ratio Ratio corresponds to target through transmission ratio tRatio.

Moreover, in this shift map, a mode switching shift line for performing the shift of auxiliary transmission mechanism 30 (a 1-2 shift line of auxiliary transmission mechanism 30) is set to be overlapped with the low speed mode highest line. The through transmission ratio corresponding to the mode switching shift line (hereinafter, referred to as a mode switching transmission ratio mRatio) is equal to a low speed mode highest transmission ratio.

When the operating point of transmission 4 crosses the mode switching shift line, that is, when through transmission ratio Ratio is varied to be across mode switching transmission ratio mRatio, transmission controller 12 performs the mode switching shift control. In this mode switching shift control, transmission controller 12 performs the shift of auxiliary transmission mechanism 30, and performs a coordinative shift (cooperative shift) to vary transmission ratio vRatio of variator 20 in a direction opposite to a direction in which transmission ratio subRatio of auxiliary transmission mechanism 30 is varied.

In this coordinative shift, when through transmission ratio Ratio of transmission 4 becomes a state smaller than mode switching ratio mRatio from a state larger than mode switching ratio mRatio, transmission controller 12 changes the shift stage of auxiliary transmission mechanism 30 from the first speed to the second speed (hereinafter, referred to as 1-2 shift). At the same time, transmission controller 12 increases the transmission ratio of variator 20 to the low side. Conversely, when through transmission ratio Ratio of transmission 4 becomes a state larger than mode switching transmission ratio mRatio from a state smaller than mode switching transmission ratio mRatio, transmission controller 12 changes the shift stage of auxiliary transmission mechanism 30 from the second speed to the first speed (hereinafter, referred to as 2-1 shift). At the same time, transmission controller 12 decreases the transmission ratio of variator 20 to the high side.

The coordinative shift is performed at the mode switching shift for suppressing the unnatural feeling of the driver by the variation of the input rotation which is caused by unevenness of through transmission ratio Ratio of transmission 4. On the other hand, the mode switching shift is performed when transmission ratio vRatio of variator 20 is the highest transmission ratio. This is because in this state, the torque inputted into auxiliary transmission mechanism 30 is minimized in the torque inputted into variator 20, and it is possible to ease the shift shock of auxiliary transmission mechanism 30 by shifting auxiliary transmission mechanism 30 in this state.

By following this shift map, transmission ratio vRatio of variator 20 becomes the lowest transmission ratio when the vehicle stops. Moreover, the shift stage of auxiliary transmission mechanism 30 becomes the first speed.

Next, a control when the vehicle runs on the slope road is illustrated.

When the vehicle runs on the slope road such as a climbing road (uphill road), transmission controller 12 performs a slope road upshift prohibiting control to prohibit auxiliary transmission mechanism 30 from switching from the low mode to the high mode.

Specifically, transmission controller 12 obtains the slope of the running road by the signal obtained from slope sensor 50. The slope of the road may be obtained only from slope sensor 50. Moreover, the slope may be estimated by comparing the vehicle speed predicted from the current through transmission ratio Ratio, and an actual vehicle speed VSP. Moreover, these methods may be combined.

Transmission controller 12 prohibits the upshift of auxiliary transmission mechanism 30 when it is judged that the obtained slope of the road is greater than zero, and that the vehicle is running on the slope road. Specifically, when auxiliary transmission mechanism 30 is in the low mode, transmission controller 12 prohibits the shift to the high mode. By using auxiliary transmission mechanism 30 on the lower side, the torque of engine 1 is easy to increase relative to a case in which auxiliary transmission mechanism 30 is on the high side. Accordingly, it is possible to ensure the driving force on the slope road.

On the other hand, when the upshift of auxiliary transmission mechanism 30 is prohibited on the slope road and the vehicle runs in the low mode, the transmission ratio of variator 20 when the operating point is in the B region is on the higher side relative to a case in which auxiliary transmission mechanism 30 is in the high mode.

In this state, when the vehicle is brought from a coast state to a stop state, a low return characteristic that variator 20 is shifted to the lowest transmission ratio is deteriorated. Accordingly, the vehicle may be stopped before variator 20 is switched to the lowest transmission ratio. In a case in which the variator 20 does not become the lowest transmission ratio, a problem to decrease the driving force at the restart after this time is caused. Specifically, the deceleration degree on the slope road is increased relative to the deceleration degree on the flat road, so that the time period necessary for the stop of the vehicle is decreased. Therefore, the low return characteristic of variator 20 is deteriorated.

At the restart from this state, the driver increases the depression degree of the accelerator in accordance with the deficiency of the driving force at the start. Accordingly, the fuel consumption may be deteriorated.

Therefore, when the vehicle runs on the slope road in a predetermined running state, it is preferable that the transmission ratio of variator 20 is brought to the transmission ratio on the low side so as to suppress the deterioration of the low return characteristic.

In this embodiment, the slope road upshift control described below is performed. With this, the deterioration of the low return characteristic of variator 20 when the vehicle runs on the slope road is suppressed. Even when the vehicle restarts from the sudden stop on the slope road, it is possible to ensure the driving force at the start.

Figure 4:
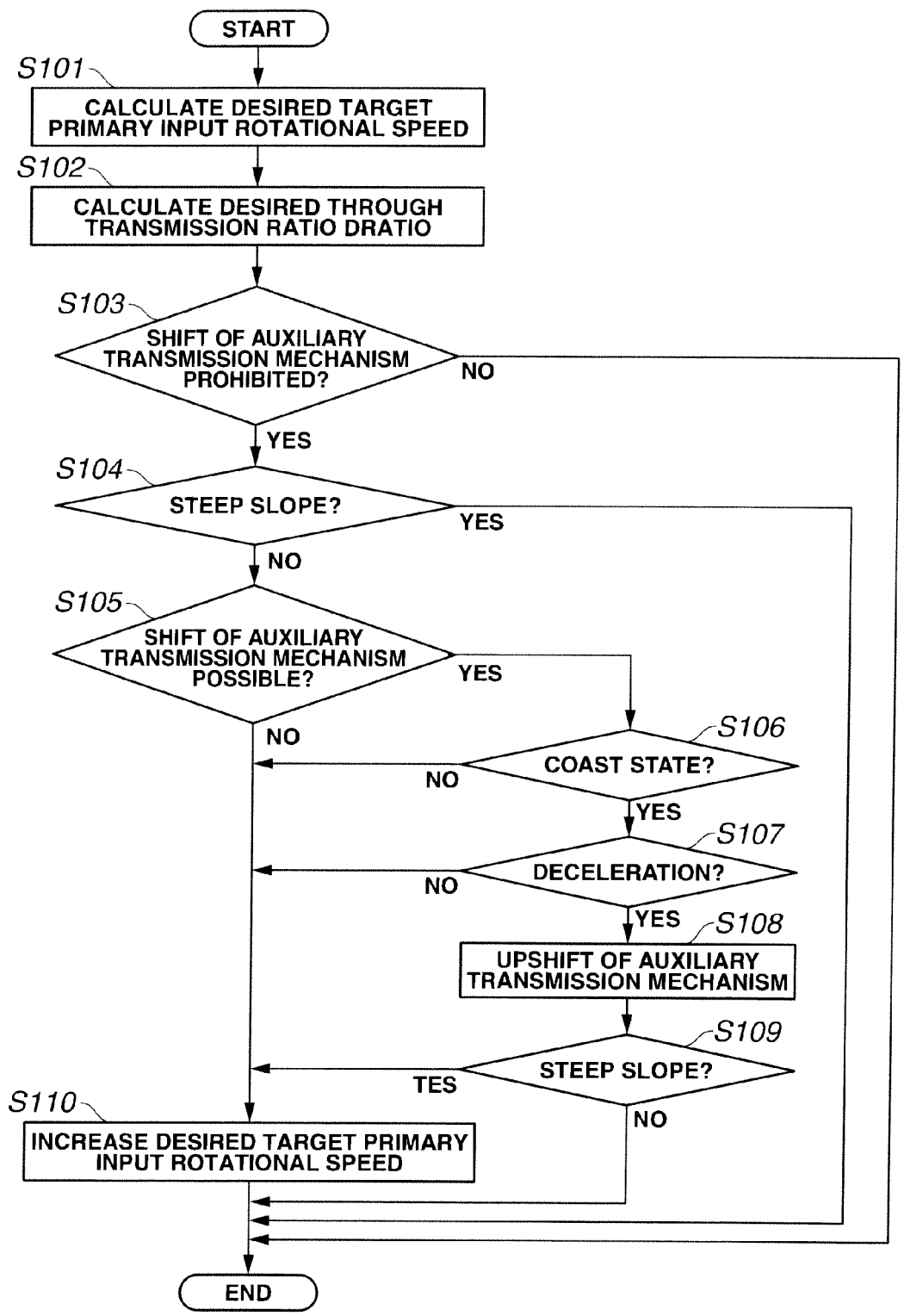
FIG. 4 is a flowchart showing a shift control when the vehicle runs on a slope road in the one embodiment of the present invention.

FIG. 4 is a flowchart showing a slope road upshift control when the vehicle runs on the slope road, which is performed in transmission controller 12 according to the embodiment of the present invention. The operation of this flowchart is performed in transmission controller 12 at regular interval (for example, 10 ms).

At step S101, transmission controller 12 calculates a desired target primary rotational speed for determining the transmission ratio from the current vehicle state (vehicle speed VSP, primary rotational speed Npri and so on). The desired target primary rotational speed is a primary rotational speed Npri corresponding to the shift point which is the target point from the current shift point in the shift map of FIG. 3. When the torque converter 2 is in a lockup state, primary rotational speed Npri is substantially equal to the engine speed of engine 1.

At step S102, transmission controller 12 determines desired through transmission ratio DRatio based on the calculated desired target primary rotational speed.

Next, transmission controller 12 judges whether or not the road is the slope road from the slope of the road which is obtained from the slope sensor 50 and so on. When the road is the slope road, transmission controller 12 judges whether or not the upshift of auxiliary transmission mechanism 30 is prohibited at step S103. When the road is not the slope road and the upshift of auxiliary transmission mechanism 30 is permitted (the answer of step S103 is negative (NO)), the process by this flowchart is finished.

When it is judged that the road is the slope road and the upshift of auxiliary transmission mechanism 30 is prohibited (when the answer of step S103 is affirmative (YES)), the process proceeds to step S104. At step S104, transmission controller 12 judges whether or not the slope road is a steep slope road. When the transmission controller 12 judges that the slope road is the steep slope road (When the answer of step S104 is affirmative (YES)), the process by this flowchart is finished while the restriction of the upshift of auxiliary transmission mechanism 30 is held. For example, it is judged that the slope road is the steep slope road when the slope is equal to or greater than 15% although the judgment of the steep slope road is depending on the detection accuracy of slope sensor 50.

When it is judged that the slope road is not the steep slope road (When the answer of step S104 is negative (NO)), transmission controller 12 judges whether or not the vehicle is in a predetermined running state from conditions of steps S105 to S107. When the vehicle is in the predetermined running state, the upshift of auxiliary transmission mechanism 30 is permitted.

First, at step S105, transmission controller 12 judges whether or not auxiliary transmission mechanism 30 can perform the upshift. When the auxiliary transmission mechanism 30 is already in the high mode, or when auxiliary transmission mechanism 30 is in an upshift disable region in which auxiliary transmission mechanism 30 cannot perform the upshift to the high mode in the shift map of FIG. 3, the process proceeds to step S110.

The upshift disable region in which auxiliary transmission mechanism 30 cannot perform the upshift is, for example, a case in which the current shift point is in the A region in the shift map of FIG. 3.

When auxiliary transmission mechanism 30 is in the low mode and in an upshift enable region (for example, the B region) (When the answer of step S105 is affirmative (YES)), the process proceeds to step S106. At step S106, transmission controller 12 judges whether or not the current driving state is the coast state. When the transmission controller 12 judges that the current driving state is not the coast state (When the answer of step S106 is negative (NO)), the process proceeds to step S110. When transmission controller 12 judges that the current driving state is in the coast state (When the answer of step S106 is affirmative (YES)), the process proceeds to step S107.

At step S107, transmission controller 12 judges whether or not the vehicle is during the deceleration at this time. When transmission controller 12 judges that the vehicle is not during the deceleration (When the answer of step S107 is negative (NO)), the process proceeds to step S110. When transmission controller 12 judges that the vehicle is during the deceleration (When the answer of step S107 is affirmative (YES)), the process proceeds to step S108. That is, when the vehicle runs on the slope road, in the coast state, and during the deceleration, the upshift of auxiliary transmission mechanism 30 is performed.

At this time, transmission controller 12 performs the upshift of auxiliary transmission mechanism 30 from the low mode to the high mode, and performs the coordinative (cooperative) shift to vary the transmission ratio of variator 20 in a direction opposite to the direction of the variation of the transmission ratio of auxiliary transmission mechanism 30. The through transmission ratios Ratio of transmission 4 before the upshift and after the upshift are not varied by the coordinative shift. The transmission ratio of the auxiliary transmission mechanism 30 is brought to the high side. With this, the transmission ratio of variator 20 becomes the lower side transmission ratio.

After the coordinative shift of auxiliary transmission mechanism 30 and variator 20, the process proceeds to step S109. At step S109, transmission controller 12 judges whether or not the current running road is the steep slope road. When transmission controller 12 judges that the current running road is the steep slope road (when the answer of step S109 is affirmative (YES)), the process proceeds to step S110. When transmission controller 12 judges that the current running road is the steep slope road (When the answer of step S109 is negative (NO)), the process by this flowchart is finished.

Figure 5:
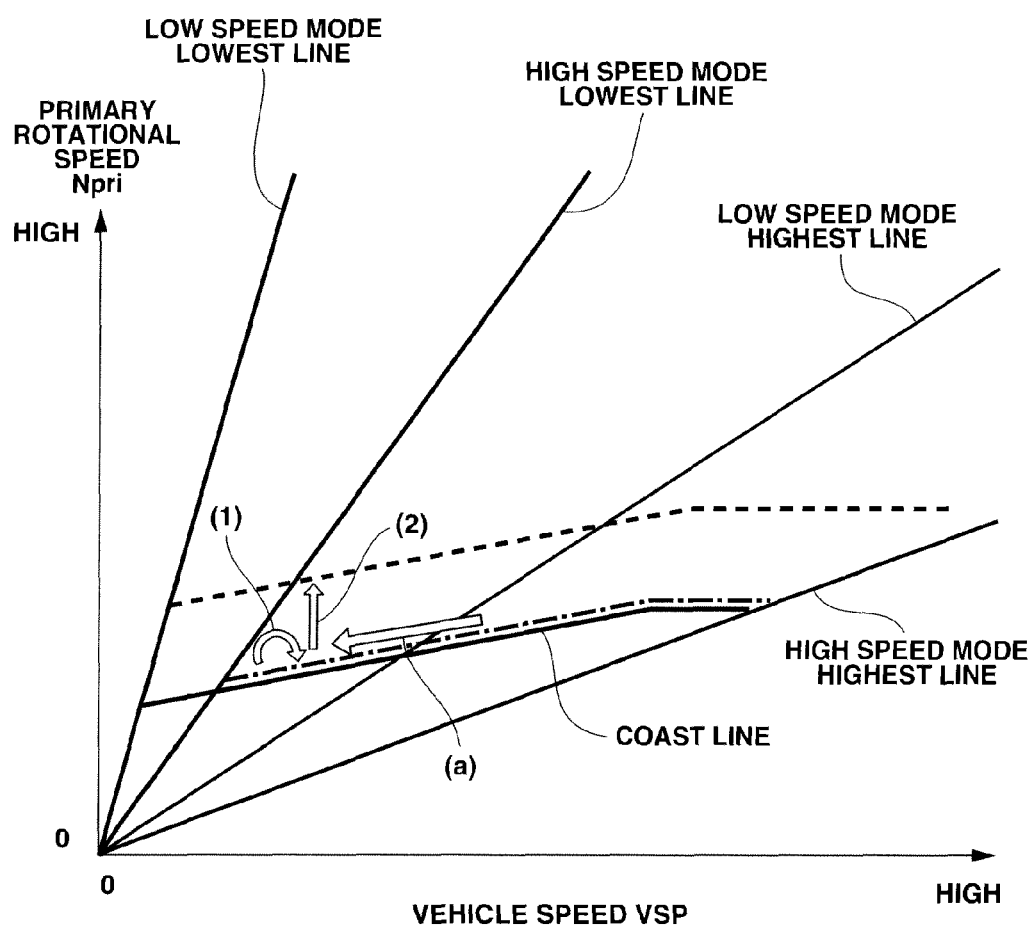
FIG. 5 is an illustrative view showing the shift control on the slope road in the one embodiment of the present invention.

When auxiliary transmission mechanism 30 cannot perform the upshift to the high mode at step S105, when the vehicle state is not the coast state at step S106, when the vehicle state is not during the deceleration at step S107, or when it is judged that the road is the steep slope road after the upshift of auxiliary transmission mechanism 30 at step S109, the process proceeds to step S110. At step S110, transmission controller 12 performs a control to increase the desired target primary rotational speed. In this embodiment, as illustrated by FIG. 5, as one example, the coast line previously set based on the minimum rotational speed of engine 1 is corrected to the side on which the engine speed of engine 1 is increased. By increasing the coast line, the desired target primary rotational speed is increased.

After the operation at step S110, the process by this flowchart is finished. Hereinafter, the desired target primary rotational speed is set based on the corrected coast line. The desired through transmission ratio DRatio of transmission 4 is determined based on the desired target primary rotational speed. The transmission ratio of transmission 4 is controlled so that through transmission ratio Ratio follows the determined desired through transmission ratio DRatio by the desired response characteristic.

FIG. 5 is an illustrative view showing a shift control on the slope road in the one embodiment of the present invention.

In this case, the shift control when the vehicle is decelerated along the coast line is shown. The coast state is a state that accelerator opening APO is zero by releasing the accelerator pedal, and that brake switch 47 senses the depression of the brake pedal by the driver.

In this coast state, as shown by an arrow (a) of FIG. 5, the shift point is moved toward the deceleration side along the coast line previously determined based on the minimum engine speed of engine 1 and so on.

In this case, in a state in which the upshift of auxiliary transmission mechanism 30 is prohibited on the slope road, when the steep slope road is not judged (step S104=NO), when auxiliary transmission mechanism 30 is in the low mode and in the upshift enable state to enable the upshift (step S105=YES), when the vehicle state is the coast state (step S106=YES), and when the vehicle is during the deceleration (step S107=YES), auxiliary transmission mechanism 30 is upshifted from the low mode to the high mode at step S108 (cf. an arrow (1)).

By the upshift of auxiliary transmission mechanism 30, the transmission ratio of variator 20 is varied to the transmission ratio on the lower side. With this, even when the vehicle stops on the slope road on which the time period necessary for the stop of the vehicle is shorter than that of the flat road, it is possible to rapidly shift to the lowest transmission ratio since variator 20 is in the transmission ratio on the lower side. Therefore, it is possible to prevent the deterioration of the low return characteristic, and to ensure the restart characteristic of the vehicle.

In this case, the driving state is controlled so that auxiliary transmission mechanism 30 is in a region between the low speed mode highest line and the high speed mode lowest line.

After the upshift of auxiliary transmission mechanism 30, when it is judged that the road is the steep slope road (step S109=YES), the coast line is corrected to the larger side (an arrow (2)), as illustrated at step S110 of FIG. 4.

By correcting the coast line to the larger side, the lower limit of the desired target primary rotational speed is increased, so that the minimum rotational speed of engine 1 is corrected to the larger side. With this, even at the coast running on the steep slope road, by correcting the transmission ratio of the variator to the low side, it is possible to prevent the deterioration of the low return characteristic of the variator even at the stop of the vehicle, and to ensure the restart characteristic.

In a case in which the coast line is corrected to the larger side, transmission controller 12 determines an amount of the correction to the large side based on the driving state of the vehicle.

Figure 6:
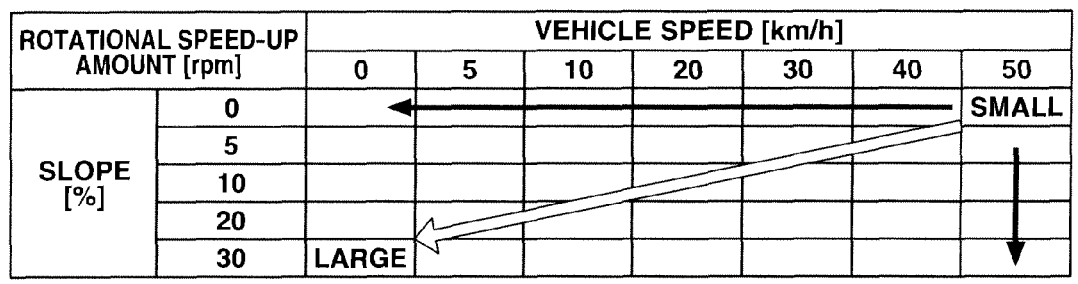
FIG. 6 is an illustrative view showing one example of a map for performing an increase of a desired target primary rotational speed in the one embodiment of the present invention.

FIG. 6 is an illustrative view showing one example of a map for performing an increase of the desired target primary rotational speed by transmission controller 12 according to the embodiment of the present invention.

As mentioned above, when the vehicle runs on the slope road and the road is the steep slope road, transmission controller 12 increases the desired target primary rotational speed for ensuring the driving force by increasing the rotational speed of engine 1.

In this case, when the vehicle speed VSP is large, the rotational speed of engine 1 is large in accordance with the large vehicle speed VSP. Accordingly, there is no need for the large correction. Moreover, by increasing the correction amount, the rotational speed of engine 1 may be accelerated, and the vehicle may be brought to the over revolution. On the other hand, the vehicle is likely to stop by the deceleration when the vehicle speed is small on the slope road. Accordingly, the correction amount is set to the larger value as the vehicle speed is smaller.

Moreover, the time period necessary for the stop of the vehicle becomes shorter as the slope of the road is steeper (larger). Accordingly, the correction value is set to the larger value as the slope is steeper.

In this way, transmission controller 12 sets the correction amount of the desired target primary rotational speed to the larger value as the vehicle speed is lower, and as the slope is steeper. The set map is previously stored in storage device 122 of transmission controller 12.

As mentioned above, the continuously variable transmission according to the embodiment of the present invention includes continuously variable transmission mechanism (variator) 20 and auxiliary transmission mechanism 30 with the plurality of the shift stages. In the thus-constructed continuously variable transmission arranged to enlarge the shift region, the upshift of the auxiliary transmission mechanism 20 is normally prohibited when the vehicle runs on the slope road. However, in the predetermined running state, that is, when the vehicle runs on the slope road and the vehicle is decelerated in the coast state, the upshift of auxiliary transmission mechanism is permitted.

In this case, the coordinative control is performed by auxiliary transmission mechanism 30 and variator 20 so as not to vary through transmission ratio Ratio. Accordingly, the transmission ratio of variator 20 becomes the transmission ratio on the low side. Consequently, the deterioration of the low return characteristic of variator 20 is suppressed. Therefore, even when the vehicle stops during the running on the steep slope road, variator 20 becomes the transmission ratio on the low side. Therefore, it is possible to ensure the restart characteristic of the vehicle, and to prevent the deterioration of the drivability.

Moreover, when the vehicle runs on the steep slope road, the correction is performed so as to increase the lower limit value (the coast line) of the desired target primary rotational speed (the engine rotational speed) so that the lower limit value of the rotational speed of engine 1 is increased. With this, it is possible to prevent the deterioration of the low return characteristics of the variator even during the running on the steep slope road, to ensure the restart characteristic from the stop, and to prevent the deterioration of the drivability.

Moreover, this correction of the rotational speed of engine 1 is set to the larger value as the vehicle speed VSP is smaller, and as the slope is steeper. With this, it is possible to appropriately ensure the driving force in accordance with the state of the vehicle and the state of the road surface.

As mentioned above, the embodiment of the present invention is illustrated. However, the above-described embodiment is only one example to which the present invention is applied. The embodiment does not limit the art region of the present invention.

For example, in the above-described embodiment, the continuously variable transmission includes the belt type continuously variable transmission mechanism as variator 20. This variator 20 may be a continuously variable transmission in which a chain is wound around pulleys 21 and 22 in place of the V belt. Alternatively, variator 20 may be a toroidal continuously variable transmission in which inclinable power rollers are disposed between an input disc and an output disc.

Moreover, in the embodiment, the auxiliary transmission mechanism 30 is a transmission mechanism including two shift stages for the forward shift stages including the first speed and the second speed. However, the auxiliary transmission mechanism 30 may be a transmission mechanism including three or more shift stages for the forward shift stages.

Moreover, auxiliary transmission mechanism 30 is constituted by the Ravigneaux planetary gear mechanism. However, the auxiliary transmission mechanism 30 is not limited to this structure. For example, auxiliary transmission mechanism 30 is constituted by combining a normal planetary gear mechanism and frictional engagement elements. Alternatively, auxiliary transmission mechanism 30 may be constituted by a plurality of power transmitting paths constituted by a plurality of gear trains having different gear ratios, and frictional engagement elements for switching these power transmitting paths.

Moreover, there is provided hydraulic cylinders 23a and 23b which serve as the actuator arranged to move the movable conical discs of the pulleys 21 and 22. However, the actuator is not limited to the hydraulic actuator. The actuator may be an electrically-driven actuator.

The continuously variable transmission according to the embodiment of the present invention includes: a variator arranged to continuously vary a transmission ratio; a stepwise auxiliary transmission mechanism disposed in series with the variator, and arranged to switch between a first shift stage on a lower speed side and a second shift stage on a higher speed side by engagements and disengagements of a plurality of frictional elements; and a shift controller configured to calculate a desired target rotational speed of the engine based on a driving state of the vehicle, to set a desired through transmission ratio which is a target transmission ratio, based on the calculated desired target rotational speed, to vary at least one of the transmission ratio of the variator and the shift stage of the auxiliary transmission mechanism, and to control so that a through transmission ratio which is an entire transmission ratio of the variator and the auxiliary transmission mechanism follows the desired through transmission ratio by a predetermined response, the shift control section including; a slope road upshift prohibiting section configured to prohibit an upshift of the auxiliary transmission mechanism when the vehicle runs on a slope road, and a slope road upshift section configured to upshift the auxiliary transmission mechanism when the vehicle runs in a predetermined running state when the slope road upshift prohibiting section prohibits the upshift of the auxiliary transmission mechanism, and to perform the shift of the auxiliary transmission mechanism while the transmission ratio of the variator is varied in accordance with the variation of the transmission ratio of the auxiliary transmission mechanism so as not to vary the through transmission ratio even when the vehicle runs on the slope road.

Accordingly, even when the vehicle runs on the slope road and the upshift of the auxiliary transmission is prohibited, the auxiliary transmission mechanism is upshifted in a predetermined running state so as not to vary the through transmission ratio. Accordingly, it is possible to set the variator to the transmission ratio on the low side. Moreover, it is possible to ensure the driving force of the vehicle, to improve the low return characteristic of the variator at the stop of the vehicle on the slope road, and to prevent the deterioration of the drivability.

The entire contents of Japanese Patent Application No. 2010-221535 filed Sep. 30, 2010 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A continuously variable transmission mounted on a vehicle, and arranged to vary a rotational speed of an engine, the continuously variable transmission comprising:
   a variator arranged to continuously vary a transmission ratio;
   a stepwise auxiliary transmission mechanism disposed in series with the variator, and arranged to switch between a first shift stage on a lower speed side and a second shift stage on a higher speed side by engagements and disengagements of a plurality of frictional elements; and
   a shift controller configured to calculate a desired target rotational speed of the engine based on a driving state of the vehicle, to set a desired through transmission ratio which is a target transmission ratio, based on the calculated desired target rotational speed, to vary at least one of the transmission ratio of the variator and the shift stage of the auxiliary transmission mechanism, and to control so that a through transmission ratio which is an entire transmission ratio of the variator and the auxiliary transmission mechanism follows the desired through transmission ratio by a predetermined response, the shift control section including:
      a slope road upshift prohibiting section configured to prohibit an upshift of the auxiliary transmission mechanism when the vehicle runs on a slope road, and
      a slope road upshift section configured to upshift the auxiliary transmission mechanism when the vehicle runs in a predetermined running state when the slope road upshift prohibiting section prohibits the upshift of the auxiliary transmission mechanism, and to perform the shift of the auxiliary transmission mechanism while the transmission ratio of the variator is varied in accordance with the variation of the transmission ratio of the auxiliary transmission mechanism so as not to vary the through transmission ratio even when the vehicle runs on the slope road,
   wherein the shift controller includes a desired target rotational speed increasing section configured to correct the desired target rotational speed of the engine to a larger side when the vehicle runs on the slope road and the vehicle runs on a steep slope road when the slope of the steep slope road is equal to or greater than 15%.

2. The continuously variable transmission claimed in claim 1, wherein the predetermined running state is that the through transmission ratio is between a first shift stage in which the auxiliary transmission mechanism is in the first shift stage on the lower speed side and the transmission ratio of the variator is minimum, and a second shift stage in which the auxiliary transmission mechanism is in the second shift stage on the higher speed side and the transmission ratio of the variator is maximum.

3. The continuously variable transmission claimed in claim 1, wherein the slope road upshift section is configured to upshift the auxiliary transmission mechanism when the vehicle is in a coast state and during deceleration.

4. The continuously variable transmission claimed in claim 1, wherein the target rotational speed increasing section is configured to correct the desired target rotational speed of the engine to the larger side as the vehicle speed is smaller, and as a slope of the slope road is larger.

5. A shift control method of a continuously variable transmission which includes a variator arranged to continuously vary a transmission ratio, and a stepwise auxiliary transmission mechanism disposed in series with the variator, and arranged to switch a transmission ratio by engagements and disengagements of a plurality of frictional elements, which is mounted on a vehicle, and which is arranged to vary an output rotation of a power source, and to output the output rotation, the shift control method comprising:
   calculating a desired target rotational speed of the power source based on a driving state of the vehicle;
   setting a desired through transmission ratio which is a target transmission ratio, based on the calculated desired target rotational speed;
   varying at least one of the transmission ratio of the variator and a shift stage of the auxiliary transmission mechanism;
   controlling so that a through transmission ratio which is an entire transmission ratio of the variator and the auxiliary transmission mechanism follows the desired through transmission ratio by a predetermined response; and
   upshifting the auxiliary transmission mechanism while the transmission ratio of the variator is varied in accordance with the variation of the transmission ratio of the auxiliary transmission mechanism so as not to vary the through transmission ratio when the vehicle runs in a predetetmined running region in a case in which the vehicle runs on a slope road and an upshift of the auxiliary transmission mechanism is prohibited.

* * * * *